F. WILLSON.
EYE SHIELD SPECTACLES.
APPLICATION FILED AUG. 26, 1915.
1,177,219.
Patented Mar. 28, 1916.
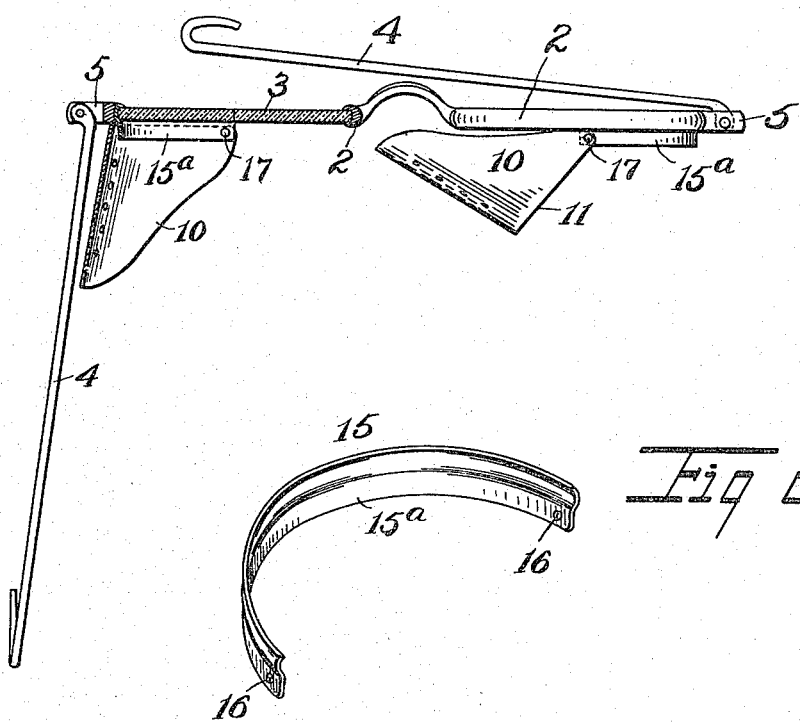
Frederick Willson
Inventor

UNITED STATES PATENT OFFICE.

FREDERICK WILLSON, OF READING, PENNSYLVANIA, ASSIGNOR TO T. A. WILLSON & CO., INC., OF READING, PENNSYLVANIA, A CORPORATION OF PENNSYLVANIA.

EYE-SHIELD SPECTACLES.

1,177,219.  Specification of Letters Patent.  Patented Mar. 28, 1916.

Application filed August 26, 1915. Serial No. 47,534.

*To all whom it may concern:*

Be it known that I, FREDERICK WILLSON, a citizen of the United States, residing at Reading, in the county of Berks and State of Pennsylvania, have invented certain new and useful Improvements in Eye-Shield Spectacles, of which the following is a specification.

The invention relates to spectacles having framed lenses with pivotally connected eye shields, and it consists in employing a simple shield connecting means which involves no change in the ordinary frame construction but advantageously coöperates with the hinged shield, as fully described in connection with the accompanying drawing and specifically pointed out in the claim.

Figure 1 is a partly sectional edge view of an ordinary spectacle frame having the invention applied thereto, the eye shields being shown in open and closed positions respectively. Fig. 2 shows separately the one-piece shield-connecting flange-strip, ready for rigid attachment to the ordinary spectacle frame and for pivotal connection thereto of the swinging eye shield.

The spectacle frame illustrated has lens-framing eye portions 2, 2 in which the lenses 3, 3 are held as usual with the edges of the lenses engaged in interor grooves of the framing eye portions; the frame indicated being of the shell type in which the lenses may be conveniently engaged by preliminarily expanding the unsplit eye portions, and the temples 4, 4 being pivoted in rigidly formed temple-connecting ears 5, 5, though the particular manner of securing the clamping effect on the framed lenses is immaterial and the common metal eye-wire framing may be equally well employed in embodying the invention.

The object is to combine with an ordinary spectacle frame as described, an ordinary folding eye shield 10; first in the simplest manner, without involving any change in the construction of these parts or in the usual method of securing the lenses; and second so as to provide a fixed flange upon the frame corresponding with the curved base portion 11 of the folding shield and adapted to overlap said base portion when the swinging shield is set for service. This is accomplished by employing a single separately formed connecting part 15, consisting merely of a strip of sheet metal or the like corresponding in length with the periphery of the base portion 11 of the shield, shaped to conform with the edge of the outer portion of lens, and having pivot-apertures 16, 16, at the termini thereof adapted to register with pivot apertures 17, 17 of the shield; said curved strip being inserted edgewise between the edge of a lens and a framing eye portion 2 and clamped in such position in the act of securing the lens as usual, so as to form a fixed inwardly projecting flange corresponding and adapted to coact with the base portion 11 of the pivotally attached shield. When a shield is folded down upon the inner face of the lens as indicated at one side of Fig. 1, this flange 15$^a$ stands alone as an approximately semi-circular frame projection, while when the shield is swung outward for service its base contacts with and is overlapped by the flange so as to provide a snug and dust-proof connection as indicated at the other side of Fig. 1. The separately formed flange strip 15 has the terminal pivot apertures 16, 16 accurately spaced therein for connection of the swinging shield previous to its becoming an immovable attachment of the completed frame structure, and the combining of the separately formed parts is positively accurate and simple.

What I claim is:

Eye shield spectacles having lens-framing eye portions, a curved flange strip rigidly clamped between the edges of each lens and its framing and provided with pivoting termini, and an eye shield pivoted to said termini and having its curved base portion adapted to swing into overlapping relation to the fixed flange strip.

In testimony whereof I affix my signature.

FREDERICK WILLSON.